Patented Oct. 11, 1932

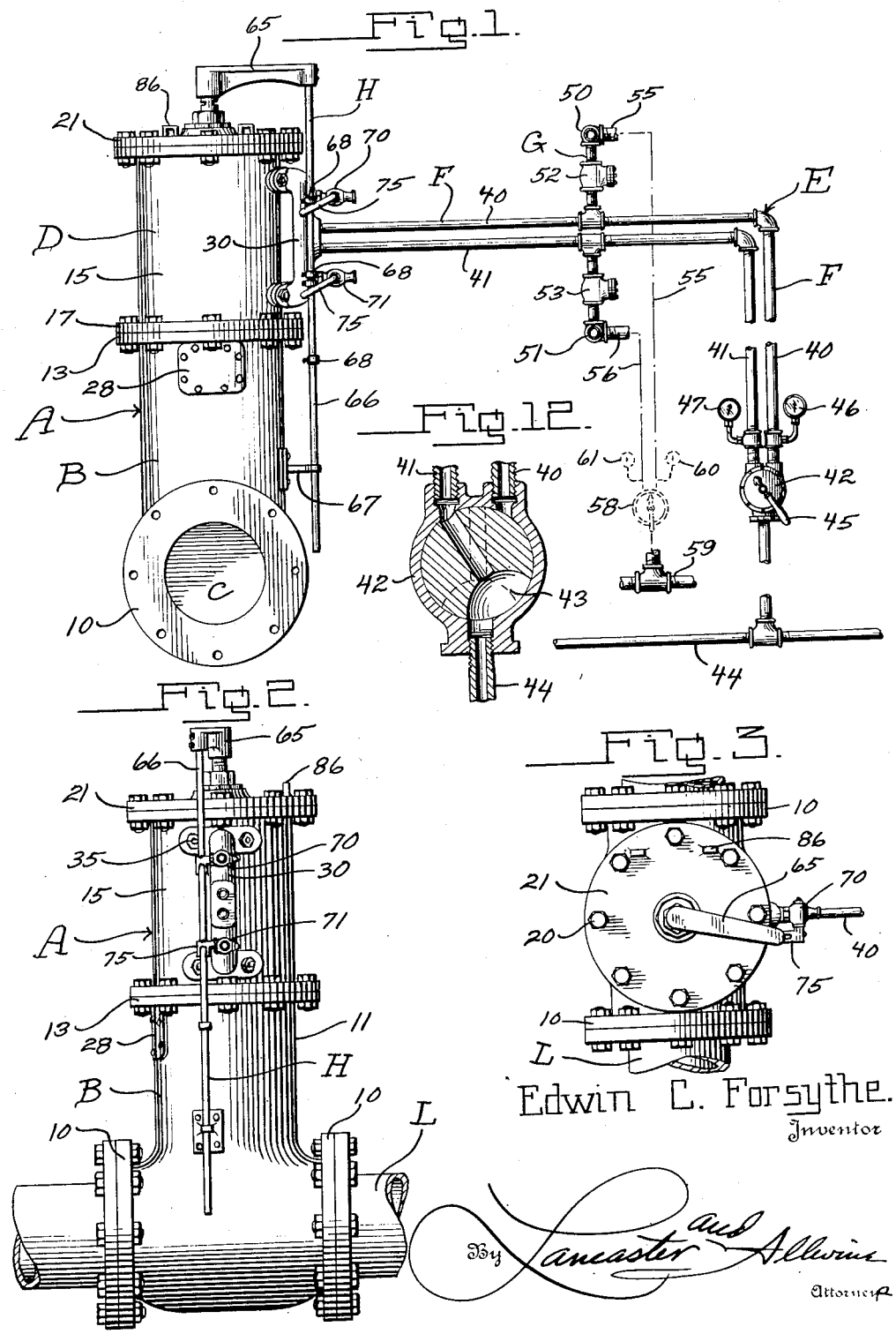

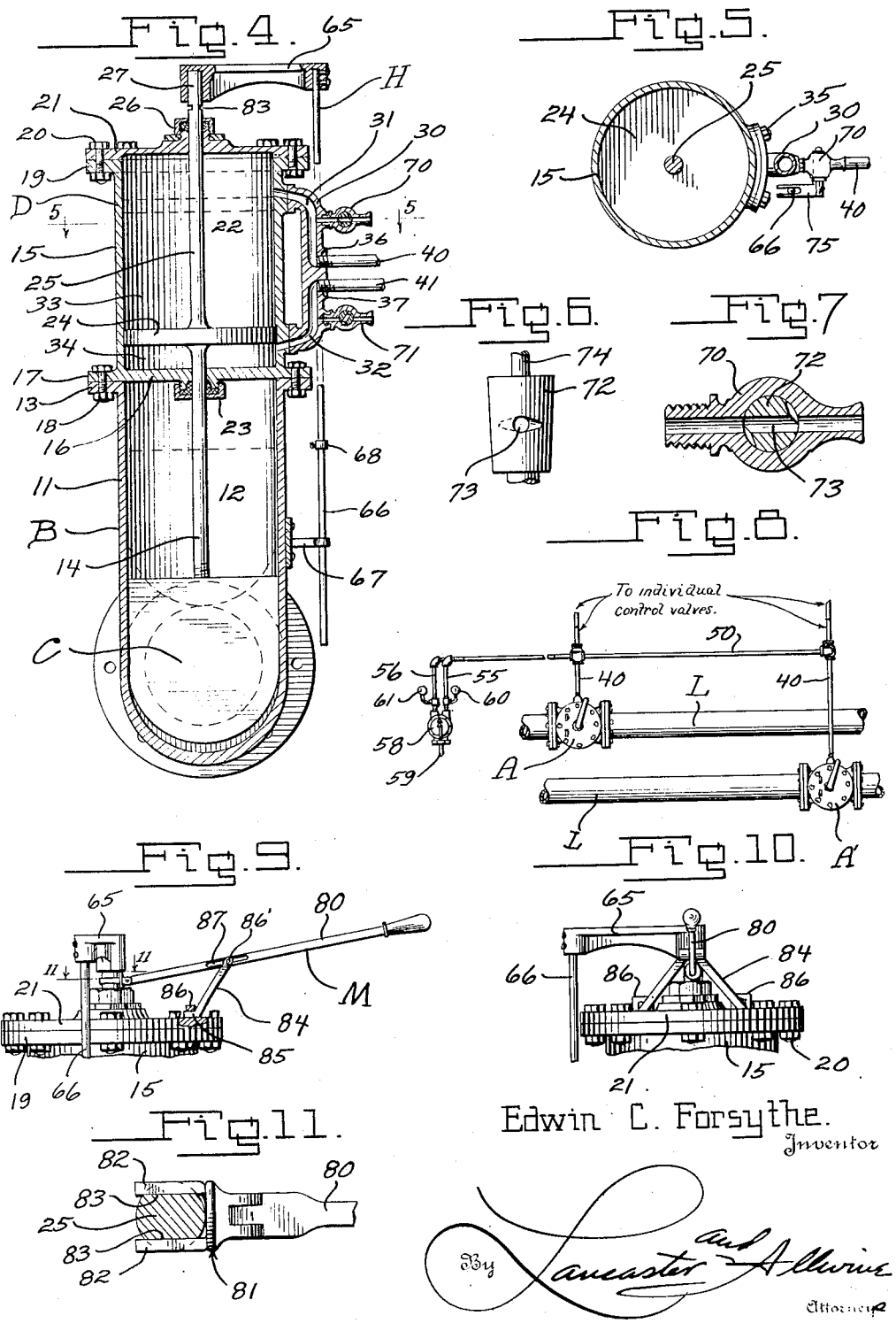

1,881,449

UNITED STATES PATENT OFFICE

EDWIN C. FORSYTHE, OF BARTLESVILLE, OKLAHOMA

MEANS FOR OPERATING VALVES

Application filed November 1, 1926. Serial No. 145,562.

The present invention relates to valves and operating means therefor, and the primary object of the invention resides in the provision of an improved type of pressure operated valve embodying control means whereby the valve may be operated either at the valve, or at a remote location therefrom.

A further object of the invention resides in the provision of a pressure operated valve embodying a control means for disposition at a remote location from the valve, and embodying means whereby the operator at a remote location from the valve will be informed that the pressure operated valve has operated satisfactorily.

A still further object of the invention resides in the provision of a pressure operated valve embodying a signalling means automatically controlled by movement of the valve to either its full open or fully closed position.

A still further object of the invention resides in the provision of a pressure operated valve embodying adjustable means for preventing the valve from opening or closing too hard and which adjustment also serves for causing the valve to open its full amount or move to its fully closed position.

A still further object of the invention resides in the provision of novel pressure control means for valves whereby valves located at inaccessible places may be effectively operated by means of a control valve located at any convenient place.

A further object of the invention resides in the provision of a novel pressure control means for a plurality of valves disposed at different locations, embodying means whereby the valves may be independently operated or all of the valves operated simultaneously as in emergency cases, for either opening or closing of the valves.

A still further object of the invention resides in the provision of a novel type of pressure operated valve embodying features of construction whereby parts thereof may be readily and easily replaced, and which valve is constructed of but comparatively few and economically manufactured parts.

A still further object of the invention resides in the provision of an operating means susceptible of attachment to various types of valve bodies, and which operating means may be applied to valve bodies for use on any size line, or any type of line, irrespective of the contents of the line.

Other objects and advantages of the invention will be apparent during the course of the following detailed description, taken in connection with the accompanying drawings forming a part of this specification and in which drawings:

Figure 1 is a view of a pressure operated valve constructed in accordance with my invention and showing the remote pressure control means therefor.

Figure 2 is a side view of the valve shown connected in a pipe line and showing the pressure control means disconnected from the valve.

Figure 3 is a top plan view of the pressure operated valve.

Figure 4 is a central vertical section through the valve and showing the same in its closed position.

Figure 5 is a transverse section taken substantially along the line 5—5 of Figure 4.

Figure 6 is a fragmentary plan view of the plug for one of the relief valves of the apparatus.

Figure 7 is a sectional view through one of the relief valves.

Figure 8 is a diagrammatic view showing two of the pressure operated valves, and showing the manner in which the valves may either be operated independently of one another or in unison.

Figure 9 is a fragmentary view of the upper portion of the pressure operated valve and showing means whereby the valve may be operated by hand.

Figure 10 is a view similar to Figure 9 and looking at the device from an angle of 90° from that as shown in Figure 9.

Figure 11 is an enlarged fragmentary section on line 11—11 of Figure 9.

Figure 12 is an enlarged detailed section thru one of the control valves of the apparatus.

Referring to the drawings in detail, and wherein similar reference characters designate corresponding parts throughout the several views; the letter A designates generally, a pressure operated valve embodying a valve body portion B provided with a valve head C, and an actuating means D for imparting movement to the valve head C. The letter E designates generally, pressure control means for the valve A, and embodies an individual control apparatus F and a group or emergency control apparatus G. The letter H designates governor means for the actuating means D; and the letter M may designate an operating means for hand operation of the valve A.

Referring first to the valve A, and which is intended for use on any size or type of line irrespective of the fluid contents of the line, in the example shown is of the straight-way wedge gate type, and is shown in position for controlling fluid flow through a pipe line or conduit L.

The valve body portion B, and which as shown is of the straight way type, is provided at its lower end with the usual flanges 10 for attachment with the pipe line L, and an upwardly extending portion 11 which provides a chamber 12 into which the valve head C moves when the valve is in its open position for allowing flow of fluid through the pipe line L. The upper or outer end of the chambered body portion 11 is provided with an outturned annular flange 13.

The valve head C, in the example shown is of the sliding wedge gate type, movable into the chamber 12 upon opening of the valve; but it is to be understood that this valve head may either be of the disc or plug type so long as the head has a sliding movement for opening and closing of the valve. A stem 14 is connected with the valve head C and extends co-axially through the chamber 12 for actuation of the valve head upon longitudinal movement of the stem.

Referring now to the actuating means D for imparting movement to the valve head C, the same embodies an operating cylinder 15 being closed at its lower end by the plate 16, and the lower end of the cylinder is provided with an annular external flange 17 whereby the cylinder may be detachably connected with the upper end of the valve body portion B as by suitable bolts 18. The upper end of the cylinder 15 is provided with an external annular flange 19 and to which is secured by means of bolts 20, a suitable cylinder head 21 thus forming a cylinder chamber 22 separated from the gate chamber 12 by the plate 16. The valve stem 14 extends through a suitable stuffing box 23 provided in the plate 16, into the cylinder chamber 22, and has mounted thereon a suitable piston 24 for sliding movement in the operating cylinder 15. An outer stem portion 25 extends from the piston 24 through a suitable stuffing box 26 provided in the head 21, and has a head portion 27 which normally projects from the cylinder 16 when the valve head C is in its fully closed position. Thus it will be seen that upon movement of the piston 24, that movement will be imparted to the valve head C for opening and closing of the valve.

A removable inspection plate 28 is provided in the upper portion of the valve body B for permitting of repacking of the stuffing box 23 without necessarily requiring the removing of the operating cylinder 15.

Referring now to the pressure control means E, and more specifically to the individual pressure control apparatus F for operation of the actuating means D, the same embodies a manifold 30 provided with independent ports 31 and 32 which communicate respectively with the outer and inner ends of the chamber 22 of the operating cylinder 15. It may be said that the piston 24 divides the chamber 22 into outer and inner chamber compartments 33 and 34 respectively. This manifold 30 may be secured longitudinally of one side of the cylinder 15 as by means of suitable fastening bolts 35 which pass through wings provided adjacent each end of the manifold. The ports 31 and 32 extend toward the center of the manifold and are provided with individual inlet openings 36 and 37 respectively which open at a right angle with respect to the longitudinal axis of the manifold.

Connected respectively with the openings 36 and 37 of the manifold 30, are closing and opening pressure feed pipes 40 and 41 respectively, and which feed pipes may extend to any remote location from the valve A for control of the valve from a remote point. Connecting the terminals of the feed pipes 40 and 41, is an individual three way control valve 42 having a way 43 whereby upon actuation of the valve, pressure may be admitted from a pressure supply line 44 into either of the feed pipes 40 or 41 for the desired operation of the valve A. This pressure in the pressure supply line 44 may be either steam, air, or residue gas etc. depending on conditions, and which fluid would be found most convenient. The control valve 42 may be operated in various manners such as by automatic control, or electrically from a distant point, and in the example shown an operating handle 45 has been provided for operation of the valve. By observing Figure 12, it will be seen that when the operating handle is thrown to the right, pressure will be admitted to the opening feed pipe 41, when swung to the left, pressure will be admitted to the closing feed pipe 40, and when swung to a truly vertical position pressure will be prevented from entering either of the feed pipes 40 or 41. Mounted respectively in the pipes 40 and 41, and preferably at a location visible to the operator of the control valve 42, are pressure gauges 46 and 47 which are intended to register pounds pressure when a pressure is admitted to either of their respective feed pipes. The advantages to be gained by use of the pressure gauges 46 and 47 will be subsequently explained.

The group or emergency control apparatus G, and which is intended for simultaneous actuation of a plurality of the valves A, embodies a closing pressure header 50 and an opening pressure header 51 which are connected through check valves 52 and 53 respectively, with the pressure feed pipes 40 and 41 respectively. These pressure headers 50 and 51, and as will be observed in Figure 8 of the drawings, may be connected with any number of the valves A through the respective pressure feed pipes of the valves. The pressure headers 50 and 51 are all connected by means of conduits 55 and 56, with a common group or emergency control valve 58 suitably connected with a pressure supply line 59, and which supply line may or may not form a part of the pressure supply line 44. The conduits 55 and 56 have connected therein at a point adjacent the group control valve 58, pressure gauges 60 and 61 respectively for indicating pounds pressure passing through their respective conduits. The group control valve 58 may be of a construction like that of the individual control valve 42 and may if so desired, be manually or automatically operated in any suitable manner.

Referring now to the governor means H for the actuating means D, and which means permits of movement of the actuating means to an open and closed position, the same embodies in part a bracket arm 65 carried by the valve stem, and which arm supports a governor rod 66 for movement with the valve stem. The bracket arm 65 is rigidly mounted at one end to the head portion 27 of the stem 25, and projects over and past the cylinder head 21 for receiving at its outer end, one end of the governor rod 66, the rod 66 extending longitudinally to one side of the manifold 30 and having its lower end slidably mounted in a suitable guide 67 carried by the valve body B. Mounted on the rod 66, and adjustable therealong, is a suitable number of lugs 68 which during movement of the rod, are adapted to function for proper opening and closing of co-acting relief valves 70 and 71 carried by the manifold 30, and forming relief ways for the ports 31 and 32 respectively. Each of the relief valves 70 and 71 are provided with rotatable plugs 72 provided with transverse ports 73, and with the stem 74 of each plug adjustably carrying a bifurcated lever arm 75 the forked end of which embraces the governor rod 66 as clearly illustrated in Figure 5. By observing Figure 1, it will be seen that upon reciprocatory movement of the rod 66, that the lugs 68 will engage the relief valve lever arms 75 for rotating of their respective plugs 72. These lever arms 75 are so connected with the plug stems 74, that although the arms 75 are disposed in a like position, one of the valves will be open while the other is closed as illustrated in Figure 4. By observing Figure 4 it will be seen that the relief valve 70 is open while the relief valve 71 is closed, and that when the rod 66 moves upwardly, the lugs 68 will engage their respective lever arms in a manner for closing of the relief valve 70 and opening of the relief valve 71. Thus it will be seen that the valves 70 and 71 are alternately opened and closed upon reciprocatory movement of the rod 66 for alternately releasing pressure from the chamber compartments 33 and 34 of the cylinder 15.

The operating means M and which has been provided for hand operation of the valve A, should such become desirable, embodies a hand lever 80 having a forked head 81 pivotally carried by its forward end, with the arms 82 of the head adapted for sliding fit in transversely extending guideways 83 provided in the valve stem portion 25 directly above the cylinder head 21. A pivot bracket 84 is provided for the lever 80, and embodies offset feet 85 which are adapted to slidably fit beneath recess lugs 86 preferably cast integral with the cylinder head 21 and projecting upwardly from the outer face thereof. The upper end of the bracket 84 carries a pivot pin 86' which is adapted to extend through an elongated slot 87 provided in the lever 80 for permitting of the forked head 81 to be moved into position about the valve stem portion 25. Upon observing Figure 9 it will readily be seen that upon grasping of the outer end of the lever 80, that the lever may be swung about the pin 86' as a fulcrum for raising and lowering of the valve head C, and that when desirable, the operating means M may readily be disconnected from the valve stem and cylinder head.

As to the mode of operation for the valve A as by means of the individual control valve 42, and assuming that the valve head C is in its closed position as illustrated in Figure 4, and in which position the rod 66 has moved downwardly for opening of the relief valve 70 and closing of the relief valve 71, the control handle 45 is swung to an opening position as illustrated in Figure 1 with the result that pressure from the supply line 44 passes through the pressure opening feed pipe 41 through the port 32 of the manifold 30 and into the inner chamber compartment 34. With the increasing pressure admitted into the compartment 34, the piston 24 will move upwardly or outwardly and carry the valve head C to an open position within the chamber 12 for providing an opening through the pipe line L. This outward movement of the piston 24 carries the rod 66 upwardly to a position whereby the lugs 58 will properly engage the relief valve lever arms 75 in a manner for closing of the relief valve 70 and opening of the relief valve 71 when the valve head C has moved to its fully open position. Upon movement of the valve head C to its fully open position, and the consequent opening of the relief valve 71, the head of pressure in the compartment 34 will escape through the valve 71 with a hissing sound and thus inform the operator, if within hearing distance, that the valve has moved to its fullest open position. This alternate opening of the relief valves also allows for escape of air from the compartments 33 and 34 for preventing any possible back pressure during operation of the valve A. Referring again to Figure 1, and assuming that the valve has moved to its full open position, and the governor rod 66 has functioned for opening of the relief valve 71, the operator will be informed by a drop in pressure recorded in the indicator 47, that the valve has so moved to an open position and that the control valve 42 may be swung to an off position. Thus it will be seen that the pressure gauges 46 and 47 will inform an operator at a remote location from the valve A, that the valve has been fully opened or closed by merely observing the drop in pressure upon opening of the relief valves on operation of the valve A. It is believed to be readily apparent the manner in which the valve head C may be moved to a closed position upon proper operation of the control valve 42 for the admitting of a pressure into the compartment 33 of the actuating means.

When the valve head C has moved to its fully closed position, and the rod 66 closes the relief valve 71, the compartment 34 will be fully shut off from communication with the atmosphere, and thus form a suction chamber upon any tendency of the piston to move upwardly for retaining the head C in position upon its seat. When the valve head is moved to its open position, the compartment 33 will be shut off from the atmosphere and act as a suction chamber upon any tendency of the piston to move downwardly for retaining the head in its open position.

When the control valve 42 is moved to a position for allowing fluid under pressure to pass through the feed pipe 40, the check valve 52 is automatically closed by the pressure in the feed pipe 40, and when the valve 42 is swung for allowing fluid under pressure to pass into the feed pipe 41, the check valve 53 is automatically closed by the pressure in the pipe 41. Thus it will be seen that when the pressure control means F is operated, that the check valves 52 and 53 serve for eliminating the necessity of a head of pressure being formed in the conduits of the group control apparatus when actuating the pressure operated valve by means of the individual control valve 42.

It will of course be apparent that the valve A need not necessarily be connected for operation by either an individual control valve or a group control valve, and that if so desired merely the individual control apparatus F may be provided for independent operation of each valve without necessarily being connected with the group or emergency control apparatus G.

As to the operation of a number of independent valves A, as by means of the group control apparatus G, this manner of operating the valves will be found desirable such as when the valves A are connected in pipe lines employed in connection with fire extinguishing systems where it is desired in case of emergencies that a number of the valves A be opened instantly and by one operation. With a number of the pressure operated valves A connected in independent pipe lines as illustrated in Figure 8, it will be seen that upon operation of the emergency control valve 58, that both of the valves A and A′ may be operated simultaneously for either opening or closing of the valves. Upon operation of the emergency control valve 58 in the desired manner, the fluid under pressure will pass through the proper pressure header 60 or 61 into one of the pressure feed pipes 40 or 41 and into the cylinder chamber 22 for movement of the valve head C in the desired direction for opening or closing of the valve.

Referring once again to the governor means H, the adjustable lugs 68 for operation of the relief valves 70 and 71 will prevent the valve from opening or closing too hard, and will also through their adjustment permit of the valve head C to move to its full opened and closed positions.

From the foregoing description it will be apparent that an improved type of pressure operated valve has been provided embodying a novel type of governor means for permitting proper opening and closing of the valve, and embodying a novel pressure control means whereby the valve may be controlled from a remote location by means of fluid under pressure, and which control means upon operation of the valve automatically indicates both at the valve and at the point of remote control, that the valve has operated satisfactorily. It will also be apparent that a novel pressure control means has been provided for pressure operated valves, embodying features whereby a number of valves may be either operated independently of one another or operated simultaneously by the operation of but one valve when desiring to operate a plurality of the pressure operated valves simultaneously.

Changes in detail may be made to the specific form of the invention herein shown and described, without departing from the spirit of the invention or the scope of the following claims.

I claim:

1. The combination with a valve body having a movable valve head provided with a stem, of fluid pressure operating means for the valve head comprising a cylinder, a piston movable in the cylinder and connected with the valve stem, a manifold having independent ports opening into the cylinder at opposite sides of the piston, a pressure feed pipe connected with each port of the manifold, a control valve connected in the pressure feed pipes at a remote location from the valve for selectively admitting fluid under pressure to either side of the piston through said feed pipes, pressure gauges connected one in each feed pipe at the remote control valve, relief valves connected with each port of the manifold, and governor means operatively connected for movement with said piston for alternate opening and closing of said relief valves for relief of the head pressure acting upon the piston at the completion of movement of the valve head to an open or closed position and allowing for a drop in pressure as recorded in the pressure gauges at the remote control valve.

2. In a device of the class described the combination of a fluid pressure operated valve embodying a cylinder and a piston movable in the cylinder, fluid pressure feed pipes connected with the cylinder at opposite sides of the piston, control means for selectively admitting fluid under pressure to opposite sides of the piston thru said feed pipes, a relief valve communicating with the cylinder at each side of the piston, and governor means embodying a governor rod alternately engageable with the relief valve for releasing the head pressure acting upon said piston upon completion of movement of the valve to either an open or closed position.

3. In apparatus of the class described the combination of a valve, a fluid pressure operated motor including a cylinder and a piston for operating the valve, a manifold having independent ports communicating with the cylinder at opposite sides of the piston, a pressure feed pipe connected with each port of the manifold, a control valve remote from the manifold for selectively admitting fluid under pressure into either of said manifold ports thru said feed pipes, a relief valve connected with each port of the manifold, and each embodying a lever arm, and a governor rod mounted for movement with the piston and engageable with the relief valve lever arms for alternate opening and closing of said relief valves for releasing the head pressure acting upon the piston at the completion of movement of the valve head to an open or closed position.

EDWIN C. FORSYTHE.